United States Patent
Iwashiro

(10) Patent No.: US 10,217,485 B1
(45) Date of Patent: Feb. 26, 2019

(54) MAGNETIC DISC DEVICE AND POSITION CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Masafumi Iwashiro, Yokohama Kanagawa (JP)

(73) Assignees: Kabushiki Kaisha Toshiba, Tokyo (JP); Toshiba Electronics Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/897,252

(22) Filed: Feb. 15, 2018

(30) Foreign Application Priority Data

Aug. 29, 2017 (JP) .................................. 2017-164001

(51) Int. Cl.
*G11B 20/10* (2006.01)
*G11B 5/596* (2006.01)

(52) U.S. Cl.
CPC .... *G11B 20/10046* (2013.01); *G11B 5/59627* (2013.01); *G11B 5/59655* (2013.01)

(58) Field of Classification Search
CPC . G11B 20/10009; G11B 5/09; G11B 2220/90; G11B 27/36; G11B 5/012; G11B 20/18; G11B 5/00; G11B 5/59627; G11B 5/596; G11B 5/02; G11B 20/10027; G11B 20/10046
USPC ........... 360/39, 46, 53, 55, 75, 65, 77.02, 67
See application file for complete search history.

(56) References Cited

U.S. PATENT DOCUMENTS

| | | | |
|---|---|---|---|
| 7,702,012 B2 | 4/2010 | Kisaka | |
| 8,503,125 B2 * | 8/2013 | Contreras | ................ G11B 5/02 360/51 |
| 8,773,808 B2 | 7/2014 | Iwashiro et al. | |
| 2016/0343393 A1 | 11/2016 | Iwashiro | |

* cited by examiner

*Primary Examiner* — Nabil Z Hindi

(74) *Attorney, Agent, or Firm* — White & Case LLP

(57) ABSTRACT

A magnetic disc device according to an embodiment has a head, a position detector, and a filter unit. The position detector detects position information of the head on the basis of servo information. The filter unit performs filtering of an estimated frequency estimated by a quadratic adaptive digital filter that performs self-adaptation for a transfer function on the basis of positional difference information between position information and target position information of the head and adjusts all filter coefficients included in the transfer function on the basis of the estimated frequency.

10 Claims, 9 Drawing Sheets

MAGNETIC DISC DEVICE AND POSITION CONTROL METHOD

CROSS-REFERENCE TO RELATED APPLICATIONS

This application is based upon and claims the benefit of priority from. Japanese Patent Application No. 2017-164001, filed on Aug. 29, 2017; the entire contents of which are incorporated herein by reference.

FIELD

Embodiments described herein relate generally to a magnetic disc device and a position control method.

BACKGROUND

In the related art, a technique of controlling position by performing filtering for an external vibration frequency using an adaptive digital filter has been proposed. For example, using an adaptive digital filter based on positional difference information of a head of a hard disk drive (HDD), a feedback control in which a position control of the head is performed by controlling a voice coil motor (VCM) is applied.

In the related art, a transfer function of the adaptive digital filter also includes a fixed filter coefficient regardless of a variation of the vibration frequency. In this case, it may be difficult to perform self-adaptation for a change of the external vibration frequency.

DETAILED DESCRIPTION

According to an embodiment, a magnetic disc device has a head, a position detector, and a filter unit. The head reads servo information on a disc. The position detector detects position information representing a position of the head on the basis of the servo information. The filter unit performs filtering for an estimated frequency estimated using a quadratic adaptive digital filter that performs self-adaptation of a certain transfer function on the basis of a positional difference information, and adjusts all of the filter coefficients contained in the certain transfer function on the basis of the estimated frequency, the positional difference information being representing a difference between the position information and target position information, the target position information being representing a target position of the head.

A magnetic disc device and a position control method according to an embodiment will now be described in details with reference to the accompanying drawings. Note that the invention is not limited to the embodiments. In the present embodiment, it is assumed that the magnetic disc device is employed as a position control device, and a head is a control target. However, the control target is not limited to the head, and the position control device may control any control target position.

Figure 1:
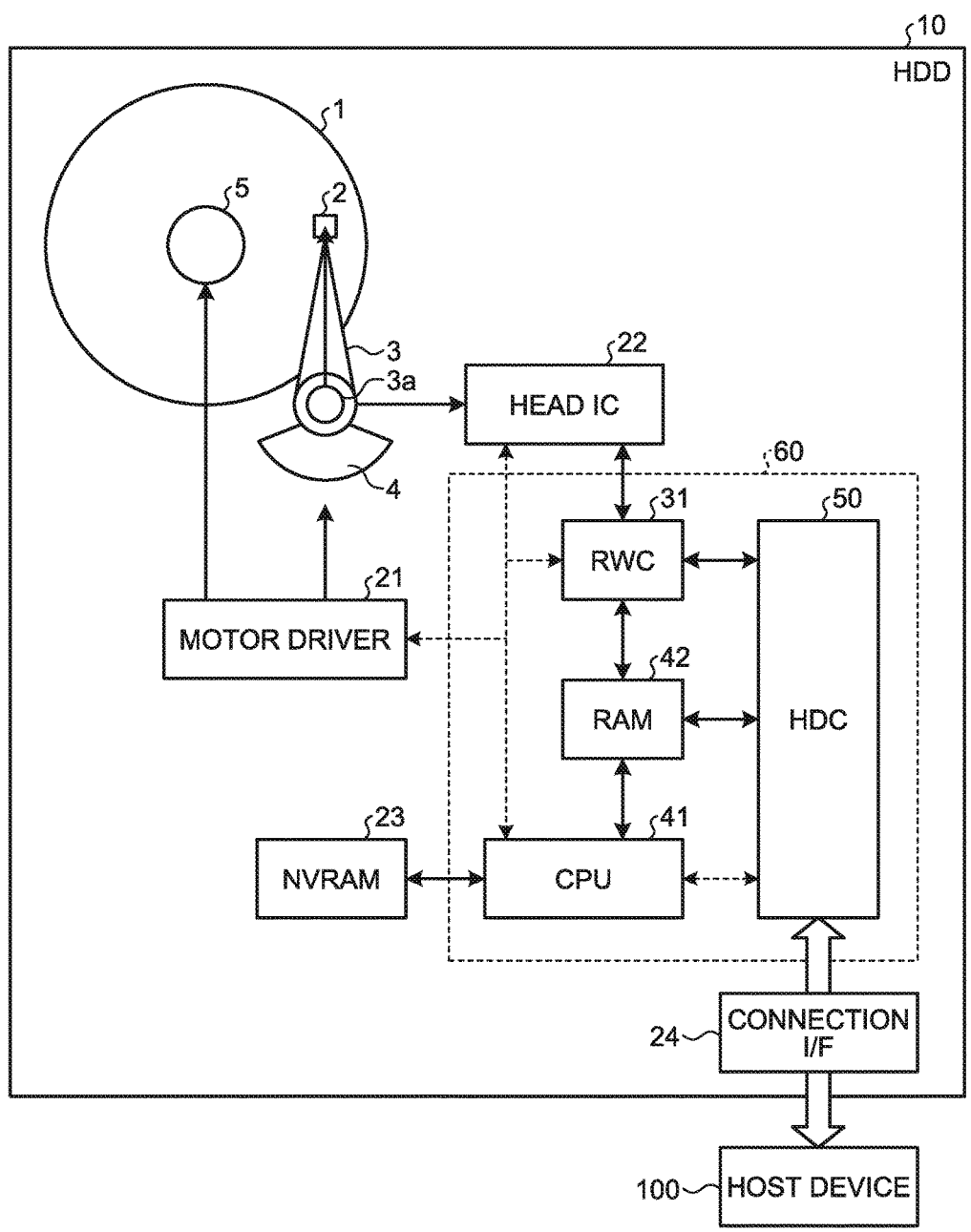
FIG. 1 is a block diagram illustrating a configuration of a HDD according an embodiment.

FIG. 1 is a block diagram illustrating a configuration of the hard disk drive (HDD) 10 according to an embodiment. As illustrated in FIG. 1, the HDD 10 has a mechanical unit provided with a magnetic disc 1, a head 2, an arm 3, a voice coil motor (VCM) 4, and a spindle motor (SPM) 5.

According to the present embodiment, it is assumed that the HDD 10 is employed as an example of the disc device. However, other drives such as an optical disc drive or a magneto-optical (MO) drive may also be employed.

Figure 2:
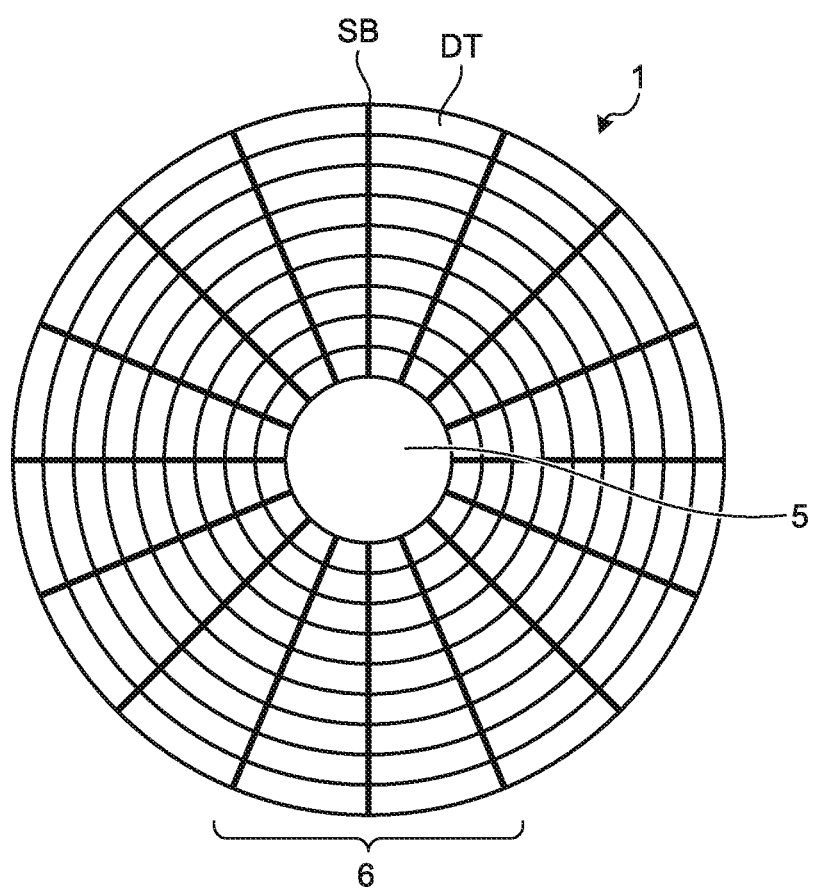
FIG. 2 is a diagram illustrating a configuration example of sectors of a magnetic disc according to an embodiment.

The magnetic disc 1 is fixed to the SPM 5 and is rotated as the SPM 5 is rotated. FIG. 2 is a diagram illustrating a configuration example of sectors of the magnetic disc 1 of FIG. 1. As illustrated in FIG. 2, at least one surface of the magnetic disc 1 is set as a recording surface were information is magnetically recorded.

As illustrated in FIG. 2, for example, a plurality of concentric tracks are defined on the recording surface, and each track has a servo region SB and a data region DT. The servo region SB and the data region DT constitute a servo sector 6. In the servo region SB, physical address information on the recording surface of the magnetic disc 1 and the servo information are recorded. The servo information contains position information for calculating a deviation of a radial direction for the track. In addition, information to be recorded in the HDD 10 is recorded in the data region DT.

Returning to FIG. 1, each part of the HDD 10 will be described. The arm 3 has a head 2 in one end portion and a bearing unit 3a in the other end portion. The arm 3 is rotated with respect to the bearing unit 3a in response to supply of a drive current (or drive voltage) to the VCM 4 to shift the head 2 on the recording surface of the magnetic disc 1 in the radial direction.

The head 2 has a read head and a write head (both not illustrated). The read head reads information magnetically recorded on the recording surface of the magnetic disc 1. The read signal is output to a head IC 22. The write head magnetically records information on the recording surface of the magnetic disc 1 in response to a write signal (write current) input through the head IC 22.

The VCM 4 is driven to rotate the arm 3 in response to a drive signal (current or voltage) supplied from a motor driver 21 described below.

The SPM 5 is driven to rotate the magnetic disc 1 in response to a drive signal (current or voltage) supplied from the motor driver 21.

The HDD 10 has a motor driver 21, a head IC 22, a non-volatile random access memory (NVRAM) 23, a connection I/F 24, and a controller 60.

The motor driver 21 supplies the drive signal for driving the VCM 4 to the VCM 4 on the basis of a control signal from the controller 60. In addition, the motor driver 21 supplies a drive signal (current) for driving the SPM 5 to the SPM 5 on the basis of a control signal from the controller 60.

The head IC 22 amplifies a signal input from the read head of the head 2 through a conductor pattern on the arm 3 and outputs the amplified signal to the controller 60 as read information. In addition, the head IC 22 outputs a write signal corresponding to the recording information input from the controller 60 to the write head of the head 2 through a conductor pattern on the arm 3.

The NVRAM 23 is a non-volatile semiconductor memory. The NVRAM 23 stores a program executed by a central processing unit (CPU) 41 and various parameters used in the process executed by the CPU 41. Alternatively, instead of the NVRAM 23, a read-only memory (ROM) or the like may also be employed.

The connection I/F 24 connects the host device 100 and the HDD 10 and is used in communication for transmitting or receiving data and commands between the host device 100 and the HDD 10. The HDD 10 is connected to the host device 100 via the connection I/F 24. As a result, the HDD 10 functions as a memory module of the host device 100.

The controller 60 is configured as a system-on chip (SOC) at least including a read write channel (RWC) 31, a CPU 41, a RAM 42, and a hard disk controller (HDC) 50. Alternatively, the controller 60 may not have the RAM 42, and a RAM 42 may be connected to the outside of the controller 60.

The RAM 42 serves as a work memory (work area) of the RWC 31, the CPU 41, and the HDC 50. As the RAM 42, for example, a dynamic random access memory (DRAM) which is a volatile memory is applied.

When the connection I/F 24 is an interface complying with the serial advanced technology attachment (SATA) standard, the HDC 50 performs a communication control with the host device 100 according to the SATA standard. Although it is assumed that the SATA standard employed as the standard of the connection I/F in this embodiment, other standard connection I/Fs such as a serial attached SCSI (SAS) or a peripheral component interconnect express (PCIe) may also be employed.

The HDC 50 controls an information transmit/receive operation with the host device 100. The HDC 50 performs encoding by applying a certain process to the decoded information from the RWC 31 and transmits the encoded information to the host device 100. In addition, the HDC 50 performs decoding by applying a certain process to the received information received from the host device 100 and outputs the decoded information to the RWC 31 as information to be recorded.

When a write command containing information on a logical address for starting recording of data and on a recording data length is received from the host device 100, the HDC 50 extracts information on the logical address and the recording data length from the received write command. The extracted information on the logical address and the recording data length is output to the CPU 41.

The RWC 31 (position detector) detects servo information corresponding to the servo region SB from the read information input from the head IC 22 and extracts the address information and the position information from the detected servo information. The extracted address information and position information are output to the CPU 41.

The RWC 31 extracts information corresponding to the data region. DT from the read information and performs decoding by applying a certain process to the detected information. The decoded information is output to the HDC 50.

The RWC 31 performs encoding by applying a certain process to the information input from the HDC 50 to be recorded and outputs the encoded information to the head IC 22 as recording information. The RWC 31 uses the RAM 42 as a work memory in order to perform such a plurality of processes.

The CPU 41 serves as processor for controlling the entire HDD 10. For example, the CPU 41 executes a program stored in the NVRAM 23 and uses the RAM 42 as a work area to implement various controls.

For example, the CPU 41 performs a rotation control for the VCM 4 and the SPM 5 and a control for a process of reproducing information from the magnetic disc 1.

Alternatively, the CPU 41 performs a position control for the head 2 in a radial direction of the recording surface of the magnetic disc 1 on the basis of the position information extracted from the servo information recorded in the magnetic disc 1. A feedback control is employed in the position control for the head 2 according to the present embodiment.

In the feedback control, the CPU 41 calculates positional difference information on the basis of the position information representing an actual position of the head 2 based on the servo information read by the head 2 from the magnetic disc 1 and target position information representing a target position of the head 2 through the feedback control. In addition, the CPU 41 performs filtering for the calculated positional difference information using an adaptive filter.

The adaptive filter according to the present embodiment adaptively estimates an unspecified frequency component (hereinafter, referred to as an "estimated frequency") of a disturbance without using a fast Fourier transform (FFT) for the positional difference information. According to the present embodiment, an infinite impulse response (IIR) type adaptive filter is employed as the adaptive filter for a position determination control of the head 2 of the HDD 10.

Figure 3:
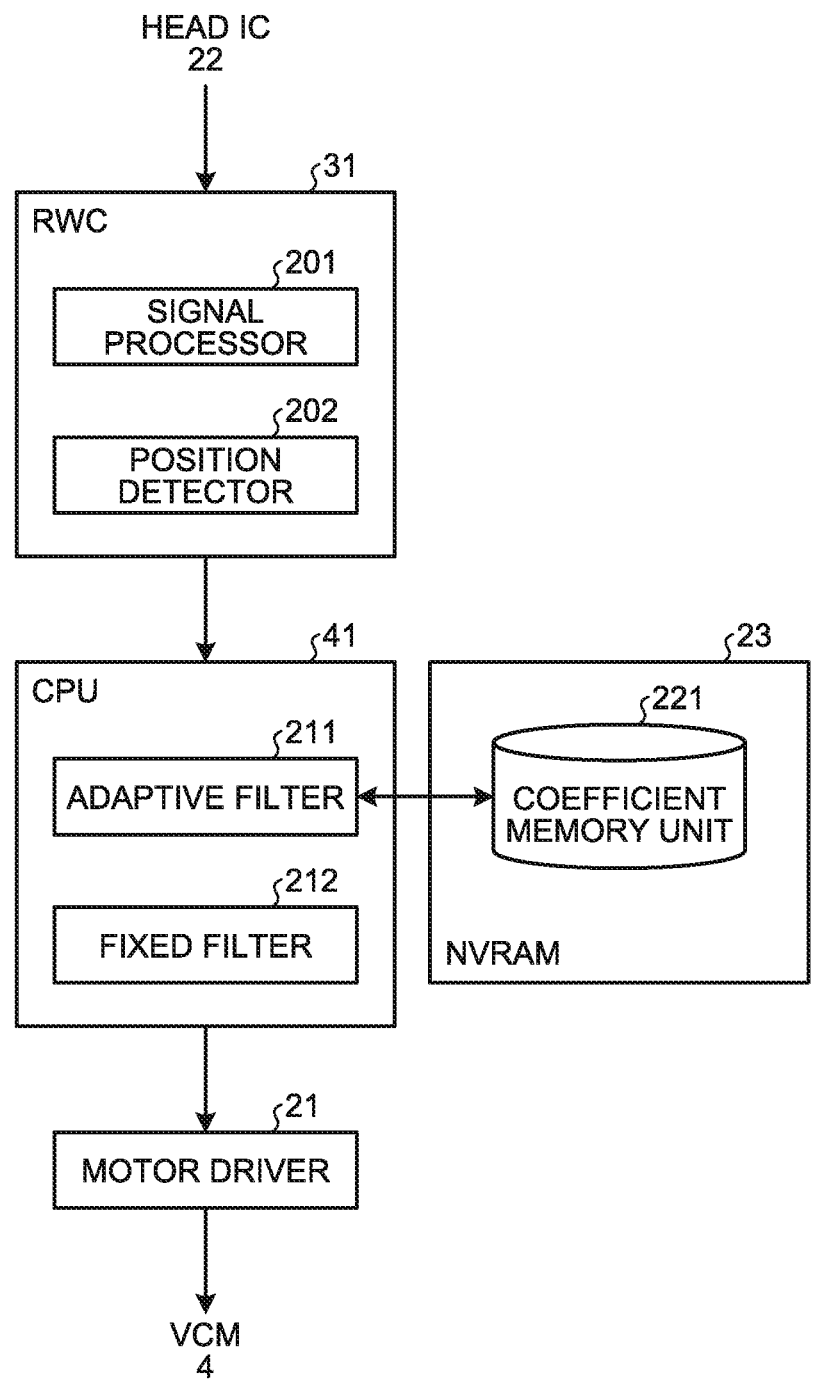
FIG. 3 is a diagram illustrating a configuration for performing a position control of a head according to an embodiment.

Next, a configuration for performing a position control of the head 2 according to the present embodiment will be described. FIG. 3 is a diagram illustrating a configuration for performing a position control of the head 2 according to the present embodiment.

As illustrated in FIG. 3, the RWC 31 has a signal processor 201 and a position detector 202. In addition, the CPU 41 implements an adaptive filter 211 and a fixed filter 212 by executing a program stored in the NVRAM 23. Furthermore, the NVRAM 23 has a coefficient memory unit 221 for use in the adaptive filter 211. Moreover, according to the present embodiment, the position control of the head. 2 is performed using the signal processor 201, the position detector 202, the adaptive filter 211, the fixed filter 212, and the motor driver 21.

The coefficient memory unit 221 stores information regarding the filter coefficient that changes depending on the estimated frequency estimated by the adaptive filter 211.

The signal processor 201 of the RWC 31 receives and processes the read information from the head IC 22. The signal processor 201 performs processes such as decoding or error correction for the input read information. The signal processor 201 outputs the processed read information to the position detector 202.

The position detector 202 detects the servo information from the read information input from the signal processor 201. The position detector 202 detects position information representing a position read by the head 2 from the detected servo information. The position detector 202 outputs the detected position information to the CPU 41.

The CPU 41 receives the position information from the position detector 202 of the RWC 31. In addition, the CPU 41 calculates the positional difference information representing a difference between an actual position indicated in the position information and a target position expressed as the target position of the head 2.

The adaptive filter 211 of the CPU 41 receives the calculated positional difference information. The adaptive filter 211 adaptively estimates an unspecified frequency component (estimated frequency) of a disturbance for the position control of the head 2 from the received positional difference information. In addition, the adaptive filter 211 performs filtering using a characteristic property based on the estimated frequency. According to the present embodiment, when the characteristic property based on the estimated frequency is derived, the information regarding the filter coefficient stored in the coefficient memory unit 221 is referenced.

In the related art, only a part of the filter coefficients of the quadratic IIR filter as an adaptive filter is updated on the basis of the estimated frequency, and the other parts of the filter coefficients are fixed and are not updated. For this reason, suppression performance is maintained when the estimated frequency is in the vicinity of a filter design frequency. However, as the estimated frequency becomes significantly different from the filter design frequency, performance is degraded.

In this regard, it is assumed that the adaptive filter 211 according to the present embodiment adjusts all the filter coefficients used as a transfer function in the IIR filter on the basis of the estimated frequency. For this reason, the coefficient memory unit 221 according to the present embodiment stores coefficients of a quadratic function for calculating the filter coefficients for each of the filter coefficients used in the transfer function of the IIR filter.

The coefficient memory unit 221 according to the present embodiment stores filter coefficients corresponding to a presumed wide frequency range. In the present embodiment, it is assumed that, for example, a filter coefficient P(w) is calculated from the following Equation (1). Note that, in Equation (1), "w" denotes the estimated frequency, and "P0, P1, and P2" denote coefficients.

$$P(w)=P0+(P1 \times w)+(P2 \times w^2) \quad \text{Equation (1)}$$

The coefficients P0, P1, and P2 are stored in the coefficient memory unit 221 as coefficients for calculating the filter coefficient P(w). A method of calculating the coefficients P0, P1, and P2 will be described below. Similarly, the coefficients Q0, Q1, and Q2 for calculating the filter coefficient Q(w) are also stored in the coefficient memory unit 221. This similarly applies to filter coefficients R(w), E(w), and F(w).

As a result, it is possible to adjust all of the (five) filter coefficients used in the IIR filter on the basis of the estimated frequency.

In addition, the adaptive filter 211 outputs the filtered information to the fixed filter 212.

The fixed filter 212 performs phase compensation or gain compensation in order to stabilize the feedback control in the position control of the head 2. In the fixed filter 212, a filter coefficient for implementing a certain transfer function is set in advance. In addition, the fixed filter 212 outputs the filtered information to the motor driver 21.

The motor driver 21 shifts the head 2 on the magnetic disc 1 by driving the VCM 4 on the basis of the information filtered by the adaptive filter 211 and the fixed filter 212. The signal read by the read head provided in the head 2 from the recording surface of the magnetic disc 1 is converted into the read information using the head IC 22 and is used in the feedback control of the position control of the head 2.

Figure 4:
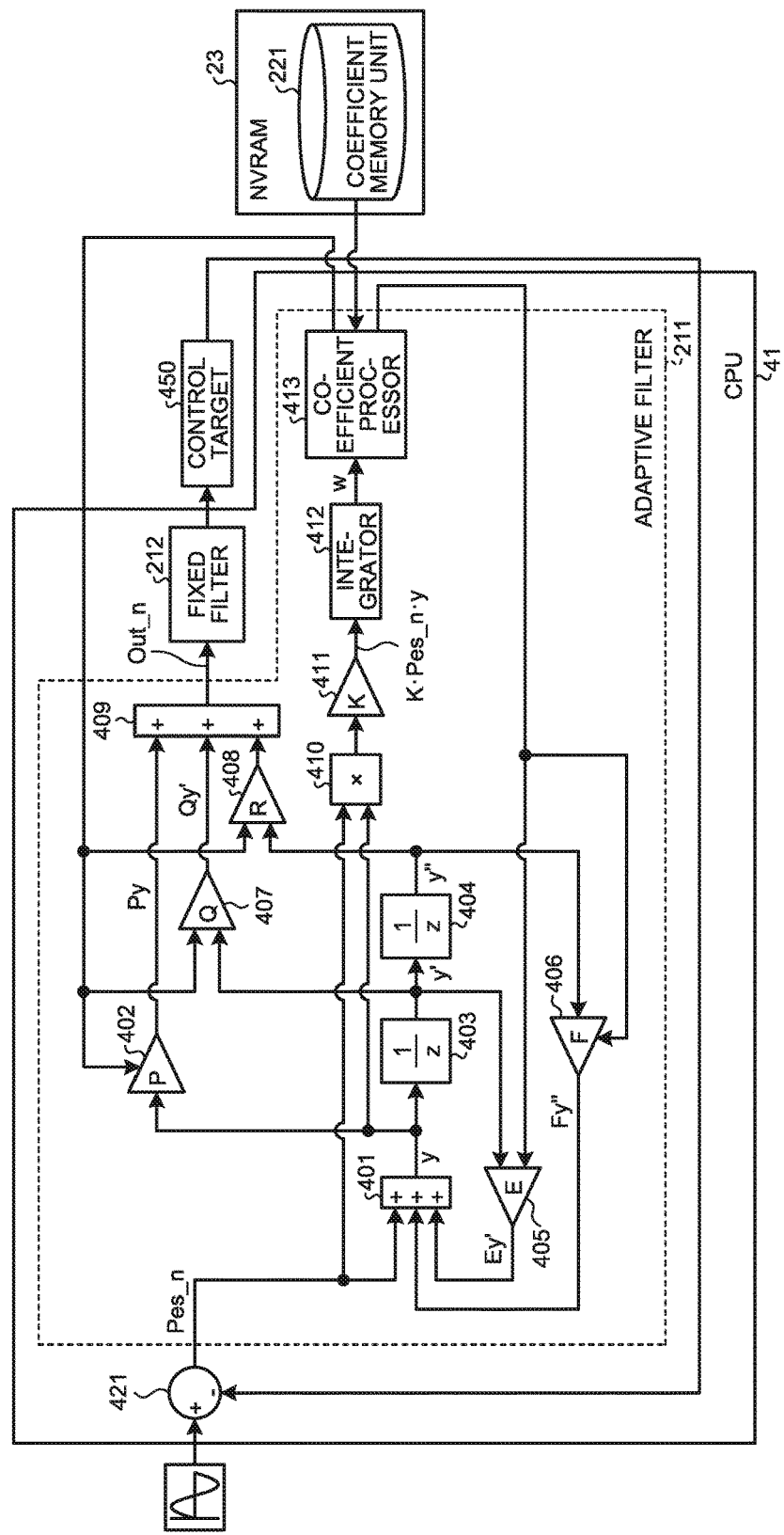
FIG. 4 is a block diagram illustrating a configuration of an adaptive filter according to an embodiment.

Next, a configuration of the adaptive filter 211 according to the present embodiment will be described. FIG. 4 is a block diagram illustrating a configuration of the adaptive filter 211 according to the present embodiment.

As illustrated in FIG. 4, a feedback control system is implemented in the head position control of the CPU 41. The CPU 41 has an adaptive filter 211 and a fixed filter 212 connected in series and functions as a position control module.

The fixed filter 212 is provided in rear of the adaptive filter 211. In addition, the control target 450 is provided in rear of the fixed filter 212. The fixed filter 212 may be provided in front of the adaptive filter 211.

The control target 450 includes blocks from the motor driver 21 to the head IC 22. In addition, the read information output from the control target 450 is input to the CPU 41.

The positional difference computation unit 421 of the CPU 41 outputs positional difference information as a result of computation based on the servo information contained in the read information to the adaptive filter 211. Specifically, the positional difference computation unit 421 outputs, to the adaptive filter 211, a value representing a difference between a target position of the head 2 indicated by the target position information based on a request from the host device 100 and an actual position of the head. 2 indicated by the position information detected from the servo information as the positional difference information.

As illustrated in FIG. 4, the adaptive filter 211 has a first adder 401, a first arithmetic unit 402, a first delay unit 403, a second delay unit 404, a sixth arithmetic unit 405, a second arithmetic unit 406, a fifth arithmetic unit 407, a third arithmetic unit 408, a second adder 409, a first multiplier 410, a fourth arithmetic unit 411, an integrator 412, and a coefficient processor 413 and performs filtering of the estimated frequency on the basis of the positional difference information.

The adaptive filter 211 according to the present embodiment is set as a high-order adaptive digital filter having a denominator coefficient and a numerator coefficient, each of which is based on the positional difference information generated from the servo information read by the head 2, when the position control for the head 2 is executed.

In the present embodiment, a quadratic IIR type adaptive digital filter is employed as an adaptive filter 211 for performing self-adaptation of a certain transfer function G(z). However, the adaptive filter is not limited to the quadratic order, and any adaptive filter may be used as long as the adaptive filter has a higher order.

The adaptive filter 211 according to the present embodiment performs self-adaptation of the transfer function G(z) on the basis of an optimization algorithm. The transfer function G(z) is expressed by Equation (2) as follows.

$$G(z)=\{(P \times z^2)+(Q \times z)+R\}/\{z^2+(E \times z)+F\} \quad \text{Equation (2)}$$

The filter coefficients P, Q, R, E, and F are coefficients set on the basis of an estimated frequency, a notch depth, and a notch width serving as a target of attenuation of the adaptive filter 211 and are adjusted whenever the estimated frequency is estimated.

That is, according to the present embodiment, the adaptive filter 211 is used as an adaptive notch filter by way of example. For example, the HDD 10 may be used under an environment suffering from vibration with a vibration frequency influenced from the outside in some cases. However, the vibration frequency at which the HDD 10 vibrates changes depending on time or place. For this reason, it is desirable to widen a frequency range for removing vibration components caused by external vibration. In this regard, according to the present embodiment, by using the adaptive filter 211 as an adaptive notch filter, it is possible to attenuate the frequency component of the external vibration applied to the HDD 10. As a result, it is possible to reduce a positional difference of the head 2.

The coefficient processor 413 adjusts the filter coefficients P, Q, R, E, and F on the basis of the external vibration and the estimated frequency using the adaptive filter 211. In addition, according to the present embodiment, all of the filter coefficients P, Q, R, E, and F included in the transfer function G(z) are adjusted whenever the estimated frequency is estimated. A specific adjustment method will be described below.

The first adder 401 according to the present embodiment outputs a denominator coefficient y derived from the transfer function G(z).

That is, the first adder 401 generates the denominator coefficient y by adding the positional difference information Pes_n; a value Exy' obtained by multiplying a primary delay value y° obtained from a primary delay of the denominator coefficient y by the filter coefficient E; and a value F×y" obtained by multiplying a secondary delay value y" obtained from a secondary delay of the denominator coefficient y by the filter coefficient F.

Specifically, the first delay unit 403 outputs the primary delay value y° which is a primary delay of the denominator coefficient y. The second delay unit 404 outputs a primary delay of the primary delay value y', that is, a secondary delay value y" which is a secondary delay of the denominator coefficient y.

The sixth arithmetic unit 405 multiplies the primary delay value y' by the filter coefficient E and outputs its result to the first adder 401. The filter coefficient E is adjusted by the coefficient processor 413.

The second arithmetic unit 406 multiplies the secondary detection value y" by the filter coefficient F and outputs its result to the first adder 401. The filter coefficient F is adjusted by the coefficient processor 413.

The second adder 409 according to the present embodiment outputs the numerator coefficient Out_n derived from the transfer function G(z).

That is, the second adder 409 generates the numerator coefficient Out_n by adding a value P×y obtained by multiplying the denominator coefficient y by the filter coefficient P; a value Q×y' obtained by multiplying the primary delay value y' obtained from the primary delay of the denominator coefficient y by the filter coefficient Q; and a value R×y" obtained by multiplying the second delay value y" obtained from the secondary delay of the denominator coefficient y by the filter coefficient R.

Specifically, the first arithmetic unit 402 outputs a value obtained by multiplying the denominator coefficient y by the filter coefficient P to the second adder 409. The filter coefficient P is adjusted by the coefficient processor 413.

The fifth arithmetic unit 407 outputs a value obtained by multiplying the primary delay value y' by the filter coefficient Q to the second adder 409. The filter coefficient Q is adjusted by the coefficient processor 413.

The third arithmetic unit 408 outputs a value obtained by multiplying the secondary delay value y" by the filter coefficient R to the second adder 409. The filter coefficient R is adjusted by the coefficient processor 413.

The integrator 412 according to the present embodiment outputs the estimated frequency w. The estimated frequency w is generated on the basis of the positional difference information Pes_n and the denominator coefficient y, each of which is shifted as time elapses.

The estimated frequency w is set as an estimated frequency estimated as external vibration that vibrates the HDD 10.

The integrator 412 according to the present embodiment generates the estimated frequency w by integrating a value obtained by multiplying, by the coefficient K, a value generated by multiplying the positional difference information. Pes_n by the denominator coefficient y. That is, the integrator 412 sets a value generated by adding "K·Pes_n·y" to the estimated frequency w' ahead of one sample as the estimated frequency w.

Specifically, the first multiplier 410 multiplies the positional difference information Pes_n by the denominator coefficient y. In addition, the fourth arithmetic unit 411 multiplies the value generated from multiplication of the first multiplier 410 by the coefficient K and generates an integration value "K·Pes_n·y" by integrating the value generated from multiplication to the estimated frequency w' ahead of one sample. Note that the coefficient K is set depending on applications.

The coefficient processor 413 derives the filter coefficients P, Q, R, E, and F on the basis of the estimated frequency w output from the integrator 412 and the coefficient memory unit 221. Specifically, the coefficient processor 413 applies the received estimated frequency w to a quadratic function of each filter coefficient by referencing the coefficients of the quadratic functions of each filter coefficient stored in the coefficient memory unit 221 to calculate the filter coefficients P, Q, R, E, and F. For example, the filter coefficient P is calculated from the aforementioned Equation (1). Note that the coefficients P0, P1, and P2 are read from the coefficient memory unit 221. Other filter coefficients Q, R, E, and F are also calculated similarly.

The coefficient processor 413 outputs the filter coefficient P to the first arithmetic unit 402, outputs the filter coefficient Q to the fifth arithmetic unit 407, outputs the filter coefficient R to the third arithmetic unit 408, outputs the filter coefficient E to the sixth arithmetic unit 405, and outputs the filter coefficient F to the second arithmetic unit 406. As a result, the filter coefficients P, Q, R, E, and F are adjusted on the basis of the estimated frequency w estimated at this time. In this manner, according to the present embodiment, the filter coefficients P, Q, R, E, and F to be used in the next filtering are adjusted on the basis of the estimated frequency w. As a result, it is possible to improve accuracy of filtering of the estimated frequency estimated as external vibration.

Figure 5:
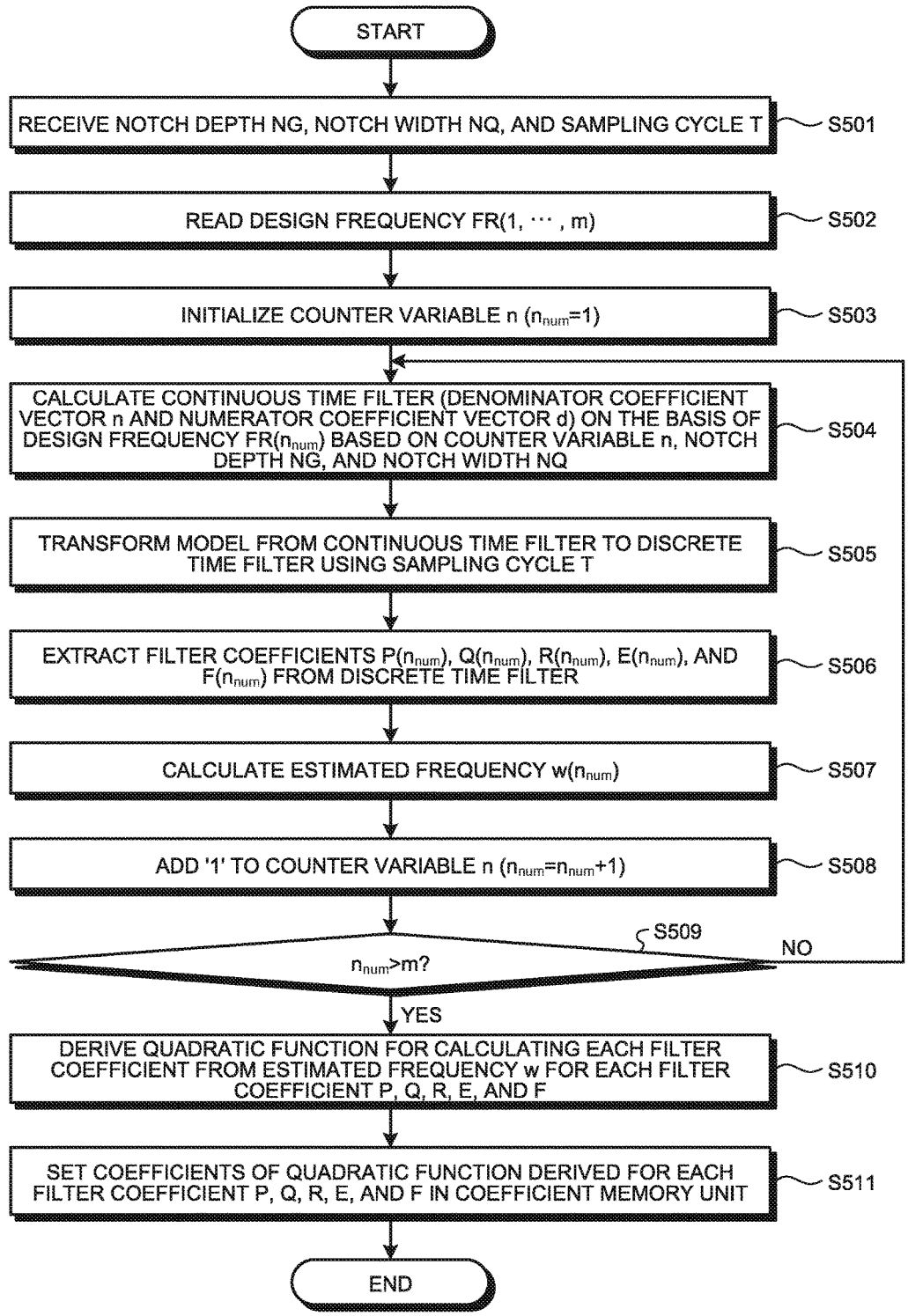
FIG. 5 is a flowchart illustrating a sequence of a process of calculating a filter coefficient set in the HDD using an information processing device according to an embodiment.

Next, a process of calculating the filter-coefficients set in the HDD 10 according to the present embodiment will be described. FIG. 5 is a flowchart illustrating a sequence of the aforementioned process using the information processing device according to the present embodiment. Note that any information processing device may be used as long as the device can execute the process of FIG. 5. For example, the information processing device may be the host device 100. In addition, a program for executing the following process using the information processing device may include any program. For example, a MATrix LABoratory (MATLAB) (Registered Trademark) program may be employed.

First, the information processing device receives a notch depth NG, a notch width NQ, and a sampling cycle T (S501). In order to receive the setting, command sentences (1) to (3) may be employed.

(1) NG=input ('depth[Hz]:')
(2) NQ=input('width:')
(3) 1=input('sampling cycle[sec]:')

Then, the information processing device reads the design frequency FR (1, . . . , m) (S502). The design frequency FR (1, . . . , m) is expressed as a matrix of the following Equation (3). Note that, in Equation (3), predetermined design frequencies FR0, FR1, FR2, . . . , and FRm are set. The predetermined design frequencies FR0, FR1, FR2, . . . , and FRm are, for example, frequencies set at a certain frequency interval in a frequency band conceived as external vibration to the HDD 10 (Equation (3)).

Design Frequency FR(1, . . . , m)={FR0,FR1, FR2, . . . , FRm}   Equation (3)

Then, the information processing device initializes a counter variable $n_{num}$, to '1' (S503).

The information processing device calculates a continuous time filter (the filter consists of a denominator coefficient vector n and a numerator coefficient vector d) on the basis of the design frequency FR ($n_{num}$) based on the counter variable $n_{num}$, the notch depth NG, and the notch width NQ (S504).

In order to produce a continuous time filter coefficient, command sentences (4) to (8) may also be employed. Note that "fr" denotes a computation frequency, "k1" denotes a first variable, "k2" denotes a second variable, and "pi" denotes a circular constant.

(4) fr=FR($n_{num}$)
(5) k1==NQ
(6) k2=k1×10^(NG/20)
(7) n=[1, 2×k1×2×pi×fr, (2×pi×fr)^2]
(8) d=[1, 2×k2×2×pi×fr, (2×pi×fr)^2]

The information processing device transforms a model from the continuous time filter (including the denominator coefficient vector n and the numerator coefficient vector d) to a discrete time filter using the sampling cycle T (S505). In order to transform the model, the command sentence (9) may be employed. In the command sentence (9), a command "c2dm" is employed in the model transformation by way of example. Note that, in the discrete model, "nd" denotes the denominator coefficient vector, and "dd" denotes the numerator coefficient vector.

(9) [nd, dd]=c2dm (n, d, T)

The information processing device extracts filter coefficients P($n_{num}$), Q($n_{num}$m), R($n_{num}$), F($n_{num}$) and F($n_{num}$) from the discrete time filter (S506). In order to extract the filter coefficients P($n_{num}$), Q($n_{num}$), R($n_{num}$), E($n_{num}$), and F($n_{num}$), command sentences (10) to (14) may be employed. Note that the vector nd(numeral k) denotes the (k)th element of the vector nd.

(10) P($n_{num}$)=nd(1) nd(2)
(12) R($n_{num}$)=nd(3)
(13) E($n_{num}$)=−dd(2)
(14) F($n_{num}$)=−dd(3)

The information processing device calculates the estimated frequency w($n_{num}$) (S507). In order to calculate the estimated frequency w($n_{num}$), a command sentence (15) may be employed.

(15) w($n_{num}$)=−2×cos(2×pi×fr×T)

Then, the information processing device performs a process ($n_{num}$=$n_{num}$+1) of adding '1' to the counter variable $n_{num}$ (S508).

The information processing device determines whether or not the counter variable $n_{num}$ is greater than the number m of the design frequency ($n_{num}$→m?) (S509). If it is determined that the counter variable is equal to or smaller than the number m of the design frequency (S509: No), the process returns to S504.

Otherwise, if it is determined that the counter variable $n_{num}$ is greater than the number m of the design frequency (S509: Yes), the information processing device derives a quadratic function for calculating the filter coefficient from the estimated frequency w for each filter coefficient P, Q, R, E, and F(S510).

For example, the information processing device according to the present embodiment derives a quadratic function, in which seventeen factors (w($n_{num}$), P($n_{num}$)) ($n_{num}$=1, . . . , m) are approximated, as a quadratic function for calculating the filter coefficient P by applying a least square method.

Similarly, the information processing device derives a quadratic function for calculating the filter coefficient Q from seventeen factors (w($n_{num}$), Q($n_{num}$)) ($n_{num}$=1, . . . , m), derives a quadratic function for calculating the filter coefficient R from seventeen factors (w($n_{num}$), R($n_{num}$)) ($n_{num}$=1, . . . , m), derives a quadratic function for calculating the filter coefficient F from seventeen factors (w($n_{num}$), E($n_{num}$)) ($n_{num}$=1, . . . m), and derives a quadratic function for calculating the filter coefficient F from seventeen factors (w($n_{num}$), F($n_{num}$)) ($n_{num}$=1, . . . m).

The information processing device sets the coefficients of the quadratic functions derived for each filter coefficient P, Q, R, E, and F in the coefficient memory unit 221 of the NVRAM 23 of the HDD 10 (S511). For example, when a function "P(w)=(P2×$w^2$)+(P1×w)+P0" is derived as the quadratic function for calculating the filter coefficient P, the coefficients P2, P1, and P0 are set in the coefficient memory unit 221. This similarly applies to other filter coefficients Q, R, E, and F, and the description thereof will be omitted.

As a result, the adaptive filter 211 of the HDD can adjust the filter coefficients P, Q, R, E, and F depending on the estimated frequency w. Therefore, it is possible to improve accuracy of the adaptive filter according to the embodiment.

Figure 6:
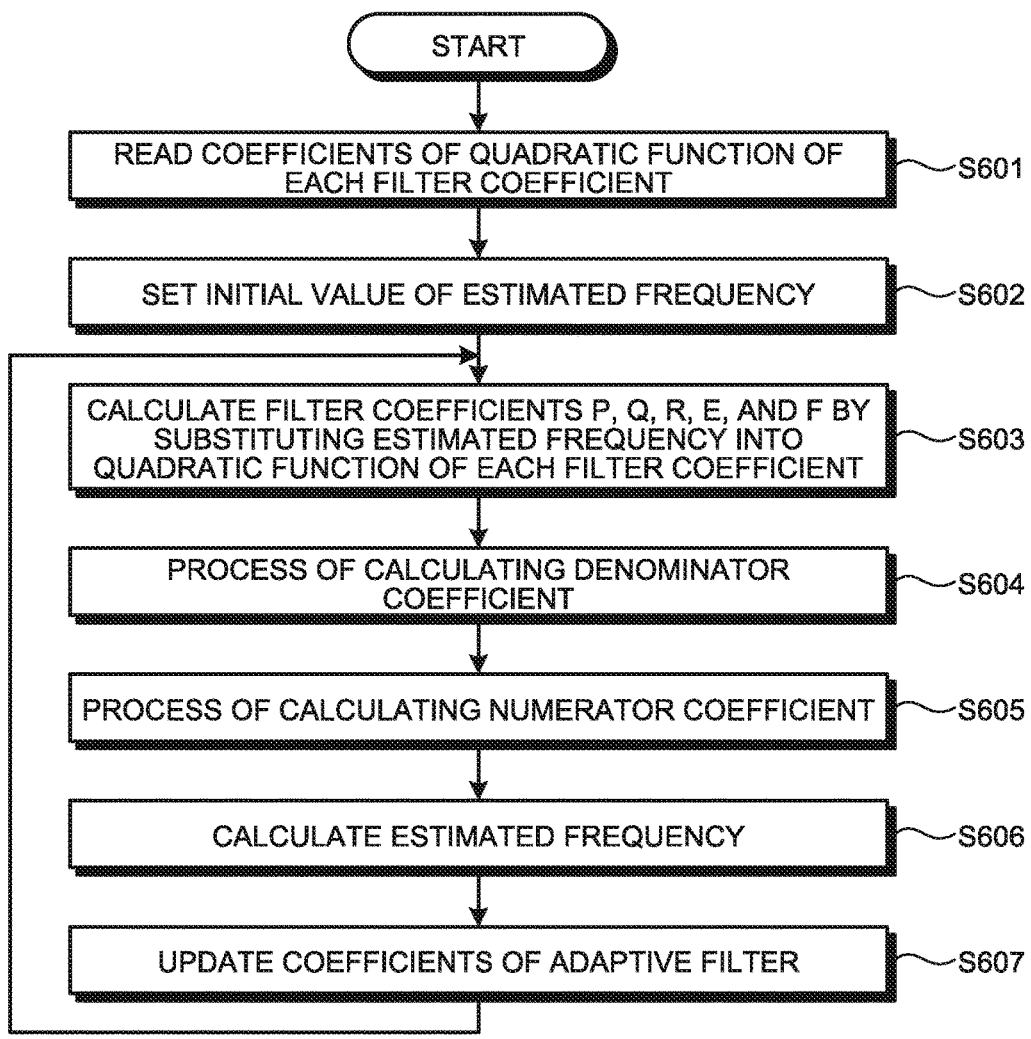
FIG. 6 is a flowchart illustrating a sequence of a process performed by the adaptive filter according to an embodiment.

Next, a process performed by the adaptive filter 211 of the HDD 10 according to the present embodiment will be described. FIG. 6 is a flowchart illustrating a sequence of the aforementioned process of the adaptive filter 211 according to the present embodiment.

First, the coefficient processor 413 reads the coefficients of the quadratic function for calculating the filter coefficients P, Q, R, F, and F from the coefficient memory unit 221 (S601). As a result, it is possible to derive the quadratic function for calculating the filter coefficient for each filter coefficient P, Q, R, F, and F.

Then, the coefficient processor 413 sets an initial value of the estimated frequency (S602). The initial value of the estimated frequency may be set to any value. For example, the initial value may be set to any one of the aforementioned values FR0, FR1, FR2, . . . , and FRm or zero.

The coefficient processor 413 calculates the filter coefficients P, Q, R, E, and F by substituting the estimated frequency into the quadratic functions derived for each filter coefficient P, Q, R, E, and F (S603). In an initial calculation, the initial value of the estimated frequency set in S602 is used. In the second and subsequent calculations, the estimated frequency calculated in S606 is used. In addition, the filter coefficients P, Q, R, E, and F calculated in S603 are used in S604 to S605. In other words, the coefficient processor 413 adjusts the filter coefficients P, Q, R, E, and F on the basis of the estimated frequency calculated in S606 in the previous filtering. In addition, the adjusted filter coefficients P, Q, R, E, and F are used in the next filtering.

The first adder 401 of the adaptive filter 211 or the like calculates the denominator coefficient y (S604). Equation (4) for calculating the denominator coefficient y is expressed as follows. In addition, "y'" denotes a previous value of the denominator coefficient, and "y''" denotes a previous but one value of the denominator coefficient. Note that, in the case of the initial S604, the coefficients y' and y'' are set to initial values.

$$y=Pes\_n+(E \times y')+(F \times y'') \quad \text{Equation (4)}$$

The second adder 409 of the adaptive filter 211 or the like calculates the numerator coefficient Out_n (S605). Equation (5) for calculating the numerator coefficient Out_n is expressed as follows.

$$Out\_n=(P \times y)+(Q \times y')+(R \times y'') \quad \text{Equation (5)}$$

The integrator 412 of the adaptive filter 211 or the like calculates the estimated frequency w (S606). Equation (6) for calculating the estimated frequency w is expressed as follows. "w'" denotes a previous value of the estimated frequency.

$$w=w'+(K \times Pes\_n \times y') \quad \text{Equation (6)}$$

The first delay unit 403 and the second delay unit 404 updates the coefficient of the adaptive filter 211 on the basis of the denominator coefficient y output from the first adder 401 (S607). Equations (7) and (8) are used in the update.

$$y''=y' \quad (7)$$

$$y'=y \quad (8)$$

In the process of FIG. 6, when the position information is input from the RWC 31, the CPU 41 calculates the positional difference information on the basis of the newly input position information. The calculated positional difference information is used in Equation (4) of S604. By repeating this process, it is possible to implement correction of the positional difference.

Figures 7, 8:
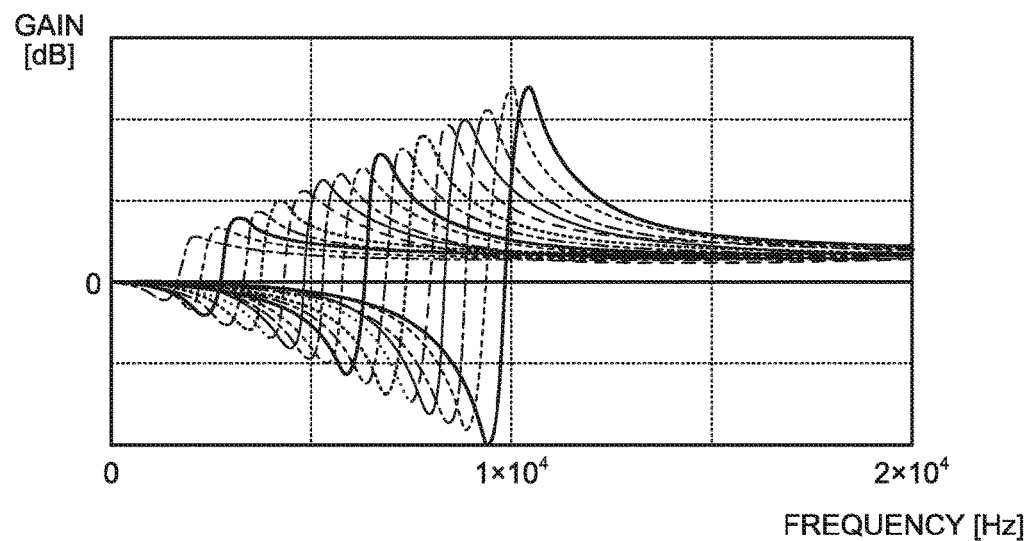
FIG. 7 is a diagram illustrating a characteristic of an IIR filter employed in the related art.
FIG. 8 is a diagram illustrating a characteristic of the IIR filter employed in the related art.

FIGS. 7 and 8 are diagrams illustrating a characteristic of the IIR filter used in the related art. In the IR filter of the related art, it is assumed that some of the filter coefficients P, Q, R, F, and F are set to fixed values. In addition, it is assumed that the filter coefficients of the fixed values are determined on the basis of the design frequency around 10 kHz.

FIG. 7 illustrates gains [dB] for each of the seventeen design frequencies FR0, FR1, FR2, . . . , and FRm described above. FIG. 8 illustrates phases [deg] for each of the seventeen design frequencies FR0, FR1, FR2, . . . , and FRm described above.

In the examples of FIGS. 7 and 8, the gain and the phase have appropriate values at the design frequency around 10 kHz. However, as the design frequency decreases, the gain and the phase are also reduced. Therefore, it is recognized that the filter characteristic is distorted.

Figure 9:
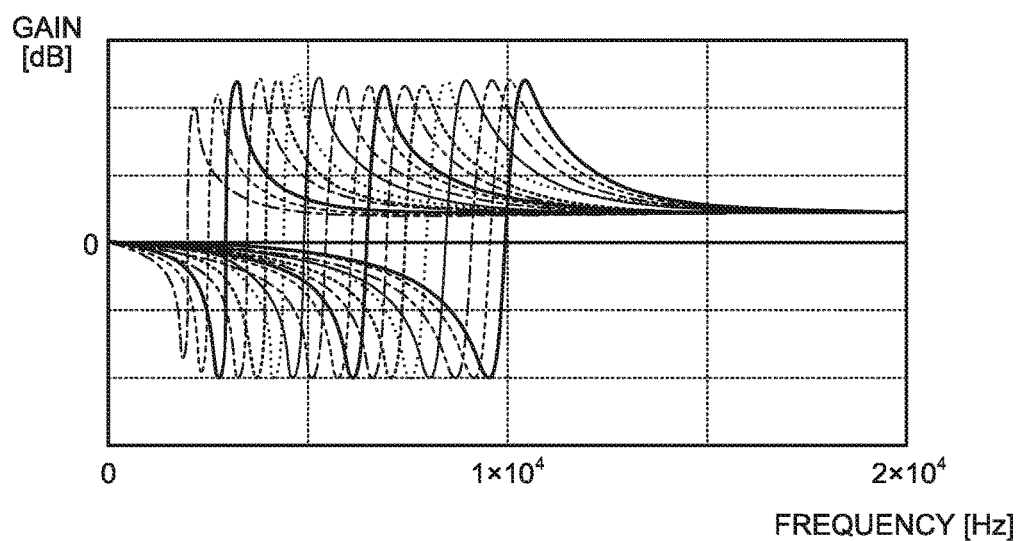
FIG. 9 is a diagram illustrating a characteristic of the IIR filter of the adaptive filter according to an embodiment.
Figure 10:
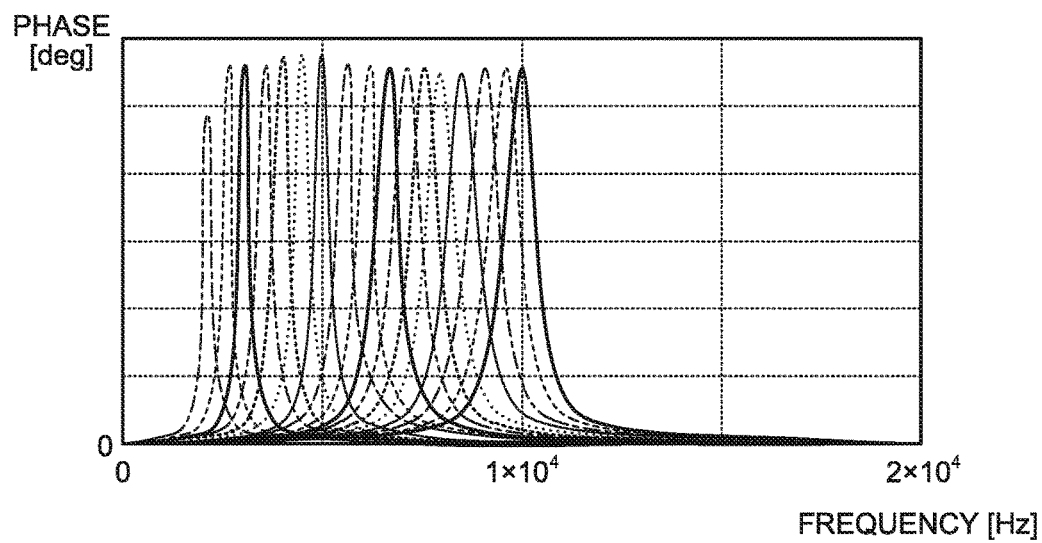
FIG. 10 is a diagram illustrating a characteristic of the IIR filter of the adaptive filter according to an embodiment.

FIGS. 9 and 10 are diagrams illustrating characteristics of the IIR filter of the adaptive filter 211 according to the present embodiment. In the IIR filter of the adaptive filter 211 according to the present embodiment, all of the filter coefficients P, Q, R, E, and F are adjusted on the basis of the estimated frequency.

FIG. 9 illustrates gains [dB] for each of the seventeen design frequencies FR0, FR1, FR2, . . . , and FRm described above. FIG. 10 illustrates phases [deg] for each of the seventeen design frequencies FR0, FR1, FR2, . . . , and FRm described above.

In the examples of FIGS. 9 and 10, the gain and the phase have appropriate values even in any one of the design frequencies FR0, FR1, FR2, . . . , and FRm. In other words, it is recognized that a sensitivity; characteristic is improved in a wide range of 2 kHz to 10 kHz expressed in at least the design frequencies FR0, FR1, FR2, . . . , and FRm.

According to the present embodiment, all of the filter coefficients P, Q, R, E, and F are adjusted depending on the estimated frequency. Therefore, it is possible to obtain an appropriate gain and phase. As a result, it is recognized that no distortion is generated in the filter characteristic of the adaptive filter 211 according to the present embodiment.

Figure 11:
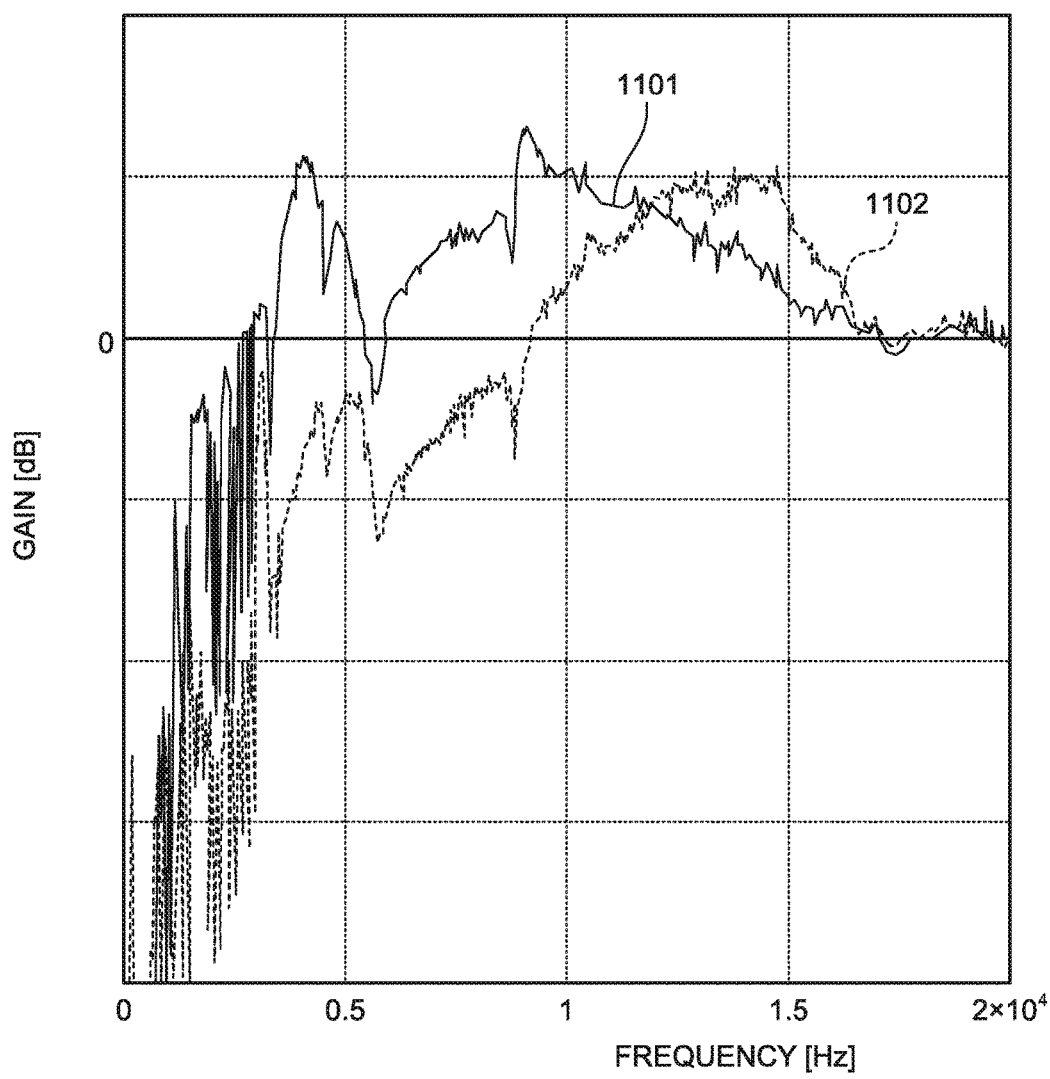
FIG. 11 is a diagram illustrating sensitivity of the adaptive filter according to an embodiment.

FIG. 11 is a diagram illustrating sensitivity of the adaptive filter 211 according to the present embodiment. The straight line 1101 of FIG. 11 indicates a sensitivity function when the adaptive filter 211 according to the present embodiment is employed. The dotted line 1102 indicates a sensitivity function when the adaptive filter 211 according to the present embodiment is not employed.

A difference of approximately 5 db within a frequency range of 2 kHz to 10 kHz is generated between the sensitivity function indicated by the straight line 1101 for a case where the adaptive filter 211 is employed and the sensitivity function indicated by the dotted line 1102 for a case where the adaptive filter 211 is not employed. In this manner, if the adaptive filter 211 according to the present embodiment is employed, it is possible to improve the gain and implement more appropriate filtering, compared to a case where the adaptive filter 211 is not employed. As a result, it is recognized that the adaptive filter 211 according to the present embodiment has improved accuracy, compared to the adaptive filter of the related art.

In the present embodiment, an example for performing a position control of the head 2 has been described. However, the present embodiment is not limited to the position control of the head 2, but is applicable as long as the position control is performed for a case where an external vibration frequency exists. For example, the present embodiment may be applied to a position control of an arm of a robot or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disc device comprising:
   a head that reads servo information on a disc;
   a position detector that detects position information representing a position where the head exists on the basis of the servo information; and
   a filter unit that performs filtering of an estimated frequency estimated by a quadratic adaptive digital filter that performs self-adaptation for a certain transfer function on the basis of positional difference information, and adjusts all filter coefficients included in the certain transfer function on the basis of the estimated frequency, the positional difference information being representing a difference between the position information and a target position information, the target position information being representing a target position of the head, wherein the filter unit adjusts the filter coefficients P, Q, R, E, and F used in the next filtering on the basis of the estimated frequency, the estimated frequency being estimated by the adaptive digital filter that performs self-adaptation of the certain transfer function G(z) satisfying Equation (A) as follows:

[Formula 1]

$$G(z)=\{(P\times z^2)+(Q\times z)+R\}/\{z^2+(E\times z)+F\} \qquad \text{Equation (A)}$$

(where P, Q, R, E, and F are filter coefficients).

2. The magnetic disc device according to claim 1, further comprising a memory unit that stores information regarding the filter coefficients P, Q, R, E, and F that change depending on the estimated frequency, wherein the filter unit adjusts the filter coefficients P, Q, R, E, and F on the basis of the estimated frequency, the estimated frequency being estimated by the adaptive digital filter and the information stored in the memory unit.

3. The magnetic disc device according to claim 2, wherein the memory unit stores a coefficient of a quadratic function that calculates the filter coefficients P, Q, R, E, and F when the estimated frequency is substituted.

4. The magnetic disc device according to claim 1, wherein the adaptive digital filter is an infinite impulse response (IIR) type digital filter.

5. The magnetic disc device according to claim 1, further comprising a fixed filter unit that performs phase compensation or gain compensation in order to stabilize a feedback control in a position control of the head for information filtered by the adaptive digital filter.

6. A position control method executed by a position control device, the method comprising:

detecting position information representing a position where a control target exists;

performing filtering of an estimated frequency estimated by a quadratic adaptive digital filter that performs self-adaptation for a certain transfer function on the basis of positional difference information, the positional difference information being representing a difference between the position information and a target position information, the target position information being representing a target position of the control target; and adjusting all filter coefficients included in the certain transfer function on the basis of the estimated frequency, wherein the filter coefficients P, Q, R, E, and F used in the next filtering are adjusted on the basis of the estimated frequency, the estimated frequency being estimated by the adaptive digital filter that performs self-adaptation of the certain transfer function G(z) that satisfies Equation (B) as follows:

[Formula 2]

$$G(z)=\{(P\times z^2)+(Q\times z)+R\}/\{z^2+(E\times z)+F\} \qquad \text{Equation (B)}$$

(where P, Q, R, E, and F are filter coefficients).

7. The position control method according to claim 6, wherein the position control device has a memory unit that stores the filter coefficients P, Q, R, E, and F that change depending on the estimated frequency, and adjusts the filter coefficients P, Q, R, E, and F associated by the memory unit with the estimated frequency estimated by the adaptive digital filter.

8. The position control method according to claim 7, wherein the memory unit stores coefficients of a quadratic function for calculating the filter coefficients P, Q, R, E, and F when the estimated frequency is substituted.

9. The position control method according to claim 6, wherein the adaptive digital filter is an infinite impulse response (IIR) type digital filter.

10. The position control method according to claim 6, further comprising performing phase compensation or gain compensation for stabilizing a feedback control in a position control for information filtered by the adaptive digital filter.

\* \* \* \* \*